April 2, 1940.  W. S. WOLFRAM  2,195,664
FRICTION CLUTCH
Filed Feb. 25, 1938  2 Sheets-Sheet 2

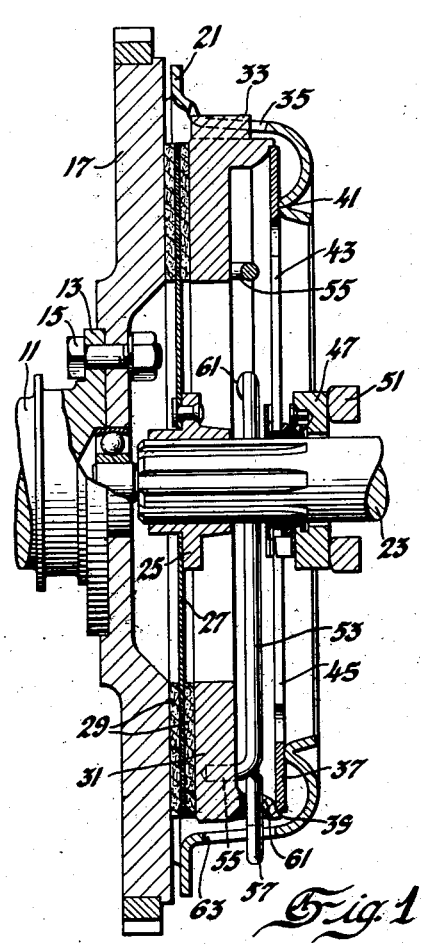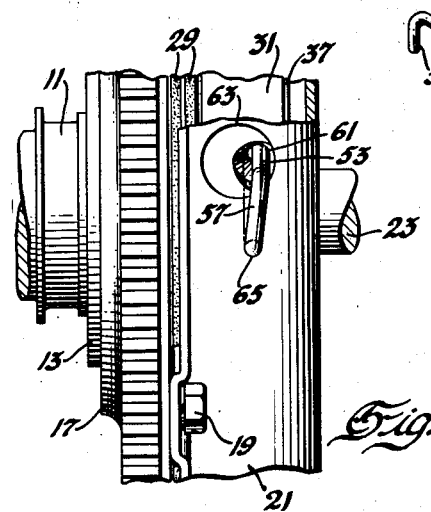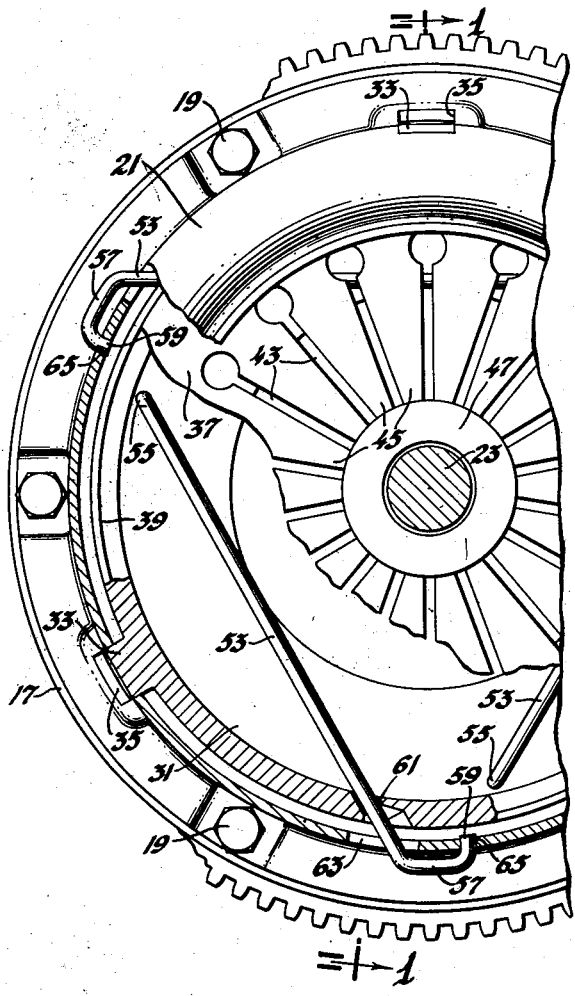

Inventor
William S. Wolfram
By Blackmore, Spencer & Flint
Attorneys

Patented Apr. 2, 1940

2,195,664

UNITED STATES PATENT OFFICE 2,195,664

FRICTION CLUTCH

William S. Wolfram, Dayton, Ohio, assignor to General Motors Corporation, Detroit, Mich., a corporation of Delaware Application February 25, 1938, Serial No. 192,514

10 Claims. (Cl. 192—68)

This invention relates to friction clutches and the embodiments illustrated are intended for use in motor vehicles between the input and output shafts of the main clutch.

One object of the invention is to secure an exceedingly high degree of smoothness in operation.

A second object is to avoid the necessity of spring fingers or tongues bent from the plane of the driven plate, a construction frequently employed.

Another object is to materially reduce the number of parts. Other objects, such as efficiency in operation and economy in manufacture will be understood from the description.

In the drawings:

Figure 1 is a transverse section on line 1—1 of Figure 2.

Figure 2 is a view in elevation partly broken away and in section.

Figure 3 is a view in edge elevation.

Figure 4 is a perspective of a spring member.

Figure 5:
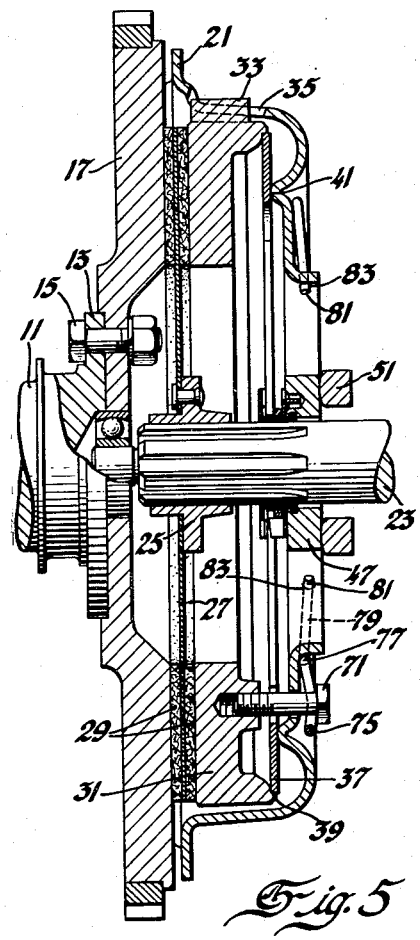
Figure 5 is a transverse section of another form of the invention, the section being on line 5—5 of Figure 6.

The first embodiment shows an engine shaft 11 having a flange 13 to which is secured by fastening means 15, a flywheel 17. Fastening means 19 secure to the flywheel a cover 21. The clutch driven shaft or transmission shaft is marked 23. It carries a hub 25 to which is secured a driven plate 27 having friction facings 29. A pressure plate 31 has a plurality of lugs 33 received in slots 35 of the cover plate and is adapted to rotate jointly with the flywheel and cover. The part 33 movable in slot 35 permits relative reciprocation. It may be stated that in conventional clutches it has been found desirable and even necessary in order to get the desired smooth action to provide axially directed tongues or fingers bent from the plane of the driven plate, these fingers being generally positioned between the facings and serving to resiliently resist the pressure directed to effect clutch engagement, the spring fingers being then restored to the plane of the plate. Such fingers are always unsatisfactory. They tend to take a set and the resilient cushioning action they afford is then lost. Their use offers a difficulty in mounting the facings against flat surfaces. In the present invention an effort has been made to avoid the necessity for such spring fingers and to secure the axial cushioning means by other instrumentalities, thus making it possible to simplify the structure of the driven disc.

As is usual in vehicle clutches a spring is used between the cover 21 and the pressure plate 31. In the present case as in other recently adopted clutches there is used a coned spring annulus or Belleville spring 37. When such a Belleville spring has been used heretofore it has been mounted on the cover plate by a plurality of pins carrying rings, washers, etc., substantially as shown by the patent to Hunt 2,138,169. By the present invention the large number of parts involved in this known form of spring mounting is avoided. The spring at its periphery engages a shoulder 39 formed at the outer margin of the pressure plate. This shoulder serves to center the spring 37. An annular rib 41 is formed in the cover to engage the spring 37. This rib takes the reaction of the spring when it is exerting pressure on the pressure plate at 39 to force the pressure plate into clutch engaging position. As is the usual practice the clutch spring 37 is formed with radial slots 43 forming spring tongues 45 to provide an easy releasing action. The inner ends of the fingers 45 are engaged by a throwout ring 47. The drawings show at 51 the forked ends of what may be regarded as a conventional throwout lever intended to push the ring 47 to the left in Figure 1 in the act of releasing the clutch.

In prior analogous devices a fulcrum support for the spring was carried by the cover and located on the side of the spring opposite the cover as shown by the above-mentioned patent to Hunt. This support required the large number of parts before mentioned, all of which are omitted by the present invention. The omission is made possible by the use of a plurality of initially tensioned spring wires. Figure 2 shows three such wires arranged in a substantially triangular relation. Obviously the number may be other than three. Six wires might be used in hexagonal formation. One of these spring wires is shown in perspective in Figure 4 where it is designated as a whole by numeral 53. It has an end 55 turned at right angles to its axis. The other end of the wire is marked 57. This end is angularly related to the axis and is formed with a right angle extremity 59. The full line position is that of the unstressed spring. The broken line shows the spring in the position it assumes when assembled.

Figure 2 shows the spring wire extending substantially as a chord of the circle of the clutch. The end 55 is directed axially into a hole of the pressure plate (see Figure 1). The other end of the straight portion extends through a small aperture 61 in the flange of the pressure plate and through a large opening 63 in the wall of the cover plate 21. The extremity, after the end 57 is twisted as suggested by Figure 4, is inserted in a radial opening in the cover as at 65. The torsional strain imparted to the spring wire is such that the wire tends constantly to move the pressure plate away from the flywheel, as will be seen by noting the wall of the aperture 61 (Figure 1) engaged by the spring wire. As long as no pressure is being applied to the throwout ring 47 the flattened Belleville spring pushes the pressure plate to clutch engaging position, the reaction of this force being taken along the circular rib 41. While the Belleville spring is so acting the torsional spring 53 is stressed and assumes the dotted line position of Figure 3, moving to this position from the full line position shown by Figure 3 as the clutch is being engaged. As the clutch moves to its clutch engaging position the torsional spring, moving from the full line to the dotted line position, is additionally stressed and this additional stressing of the torsion spring opposes the clutch engaging action of the Belleville spring just as the spring tongues of the conventional driven plate resiliently oppose the main clutch spring as they are flattened into the plane of the driven plate by that clutch engaging spring. It will be seen therefore that the torsion springs perform the function of and avoid the necessity of using the troublesome spring tongues usually found on the driven plate. In the clutch engaging position the Belleville spring, because of its own resiliency, is maintained in centralized position in contact with the shoulder 39 of the pressure plate, thus avoiding any need for the supporting means for the Belleville spring on the cover plate as heretofore used. When the ring 47 moves to the left to release the clutch the spring load is taken, at least in part, from the cover abutment at 41 and assumed by the ring 47. The torsion spring then operates to move the pressure plate to clutch releasing position, being able to do so for the reason that abutment 41 no longer takes the full reaction of the Belleville spring. At all times the action of the torsion spring serves to hold the Belleville spring supported on shoulder 39 and therefore there is no occasion for the supporting fulcrum pins heretofore used on the cover 21.

Figure 6:
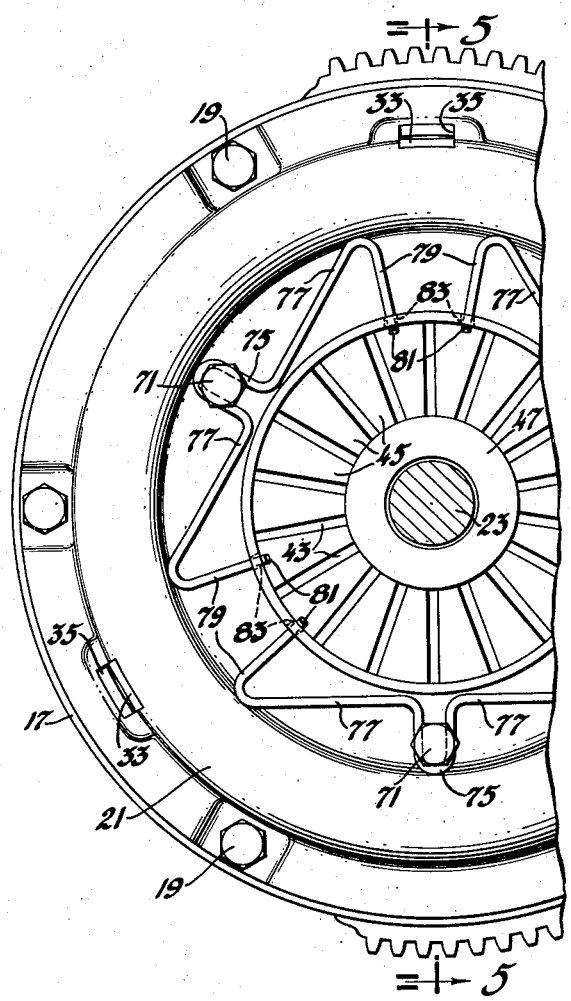
Figure 6 is a view in elevation of the second form.
Figure 7:
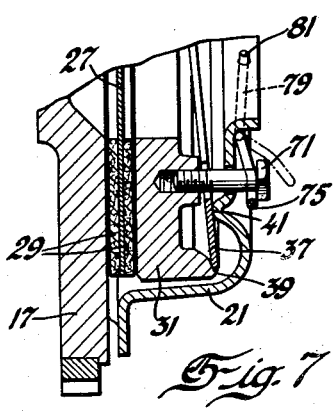
Figure 7 is a sectional view corresponding to Figure 5, but with parts displaced from the position they occupy in Figure 5.

Figures 5, 6 and 7 show a second embodiment of the invention. In this form parts corresponding to similar parts in Figure 1 are similarly marked. The only difference in this second form is in the kind of wire spring. The substitute spring is shaped as best shown by Figure 6. It has an intermediate part in the form of a loop 75 underlying the head of a threaded member 71. This threaded member passes through a hole in the cover and through an opening in the spring 37 and is then threaded into the pressure plate. From this loop 75 two oppositely directed arms 77 extend in the direction of a chord of the circle of the clutch. From the ends of arms 77 arms 79 extend substantially radially, the ends 81 of which enter holes 83 in a radial flange of the cover 21. The juncture of arms 77 and 79 are as shown in contact with the cover. Figure 7 shows how the spring is bent for placement under the head of member 71 to thereby provide the resilient energy which is always available to oppose the action of the Belleville spring and thereby produce smooth clutch engagement. As will be understood from the description of Figures 1 to 4, this spring also overcomes the pressure of the Belleville spring and moves the pressure plate to the right whenever the movement of ring 47 takes the reaction of the Belleville spring from the cover plate at 41. In this case also the wire spring cooperates with the support for the Belleville spring at 39 to avoid the necessity of providing the conventional spring supporting pins on the cover plate.

I claim:

1. In a clutch, driving means having axially spaced first and second parts and a member positioned between said parts, rotatable therewith and axially reciprocable relative thereto, driven means between said member and said first part, an annular cone-shaped spring disc engaging said second part and said member to cause said driven means to be gripped between said first part and said member, and prestressed wire spring means operable to resist the action of said coned spring disc to thereby render the clutch engagement smooth and also operable to centrally position said coned spring relative to the member and to hold it in contact with said second part.

2. The invention defined by claim 1, said wire spring means having one end anchored in said member, a mid-length portion extending through an opening in said pressure plate and its other end being torsionally stressed and anchored in said second part.

3. The invention defined by claim 1, said wire spring means comprising a length of spring wire, its ends anchored in said second part, its middle portion being bent and anchored to said member, the parts between the middle portion and the end portions substantially constituting a chord of the circle of the clutch.

4. In a clutch, including a driving member having a fixed abutment and a pressure plate, a Belleville spring engaging said pressure plate and reacting against said fixed abutment, and torsional spring means operable to maintain a centralized portion of said Belleville spring relative to said pressure plate and fixed abutment.

5. The invention defined by claim 4, said pressure plate having an annular shoulder to position said Belleville spring and said torsional spring connected to said pressure plate and said fixed abutment and operable resiliently to oppose the clutch engaging action of the Belleville spring and to maintain said Belleville spring in contact with said shoulder and said abutment.

6. In a clutch having as parts thereof an axially fixed abutment and a reciprcable pressure plate, spring means reacting on said abutment and operable to move said pressure plate into clutch engaging position, means to take the reaction of said spring means from said abutment, a torsionally stressed wire spring on the side of the abutment plate remote from the pressure plate and operably connected to said abutment plate and pressure plate to offer yielding resistance to the movement of the pressure plate by the clutch engaging spring.

7. The invention defined by claim 6, said pressure plate having a stud, said stud projecting through said abutment plate, said torsional spring having ends anchored in said abutment plate and a mid-length part bent from the plane of the remainder and held by said stud, the parts of said wire spring between its ends and its midportion extending in part as radii and in part as chords of a circle the junction of said radial and chordal parts engaging said abutment plate.

8. The invention defined by claim 6, said torsional spring having its ends anchored to said abutment plate and said pressure plate, said spring between its ends extending as a chord of the circle, and that part of the chord adjacent the end which is anchored to the abutment plate being operably engaged with the pressure plate.

9. The invention defined by claim 6, said first mentioned spring being a coned annulus peripherally seated against a shoulder of the pressure plate and engaging said abutment plate along a circular region of contact at a radial distance less than the radius of the region of contact with the pressure plate.

10. In a clutch, an abutment plate, a reciprocable pressure plate, a coned spring annulus to move said pressure plate to clutch engaging position and a torsion spring yieldingly resisting the action of said coned spring, said torsion spring also operable to maintain the centralized position of said coned spring in clutch release position.

WILLIAM S. WOLFRAM.